United States Patent [19]
Costa Pereira et al.

[11] Patent Number: 6,116,313
[45] Date of Patent: Sep. 12, 2000

[54] TIRE WITH BEADS DESIGNED TO EASE REMOVAL FROM RIM

[75] Inventors: Pedro Costa Pereira; Jean-Jacques Pradelle, both of Clermont-Ferrand, France

[73] Assignee: Compagnie Generale des Etablissementis Michelin-Michelin & Cie, Clermont-Ferrand Cedex, France

[21] Appl. No.: 08/959,049

[22] Filed: Oct. 28, 1997

Related U.S. Application Data

[60] Provisional application No. 60/058,355, Sep. 10, 1997.

[30] Foreign Application Priority Data

Oct. 30, 1996 [FR] France .................................. 96 13388

[51] Int. Cl.$^7$ ............................. B60C 15/00; B60C 15/02
[52] U.S. Cl. ........................... 152/547; 152/539; 152/543
[58] Field of Search .................................. 152/539, 543, 152/547, DIG. 9, 513, 544

[56] References Cited

U.S. PATENT DOCUMENTS 5,499,670  3/1996  Billieres .................................. 152/543

FOREIGN PATENT DOCUMENTS

| 677554 | 10/1995 | European Pat. Off. . |
| 58004608 | 1/1983 | Japan . |
| 59-220407 | 12/1984 | Japan . |
| 2004508 | 4/1979 | United Kingdom . |

OTHER PUBLICATIONS

Database WPI/Derwent JP525519 A 931005 DW9344 CO8J5/16—Oct. 1993 (Abstract).

*Primary Examiner*—Michael W. Ball
*Assistant Examiner*—Barbara J Musser
*Attorney, Agent, or Firm*—Baker Botts L.L.P.

[57] ABSTRACT

A tire in which the beads have a slip layer over part of their surface to make them slip more readily over the seats of the wheel rim upon removal after use and thus reduce the risk of damage.

8 Claims, 5 Drawing Sheets

TIRE WITH BEADS DESIGNED TO EASE REMOVAL FROM RIM

This convention application is also entitled to the priority of U.S. provisional application, Ser. No. 60/058,355, filed Sep. 10, 1997.

BACKGROUND OF INVENTION

The present invention relates to tires, and more specifically, to an improved design of tire bead intended to make the tire easier to remove from a rim.

The role of tire beads is to "secure" the tire on the wheel rim on which it is mounted. Toward this end, the carcass cords all meet at the bottom part of the bead where they are firmly anchored so that the carcass can withstand tensile loadings in service.

In addition to the stresses inherent with the actual use of the tire, the latter needs also to be capable of withstanding an unspecified number of removals followed by refittings for its continuing use.

Removal of a tire from its rim involves applying quite a high force to the bead near the flange of the wheel rim or just beyond it. This force is oriented parallel to the axis of rotation and is usually applied by a press to successive portions of the circumference of the bead that correspond to circular arcs of approximately 60 degrees. This is the first phase of removal, the purpose of which is to lift the bead, that is to say, to move it off its seat or radially inward wall by moving it away from the flange of the wheel rim and bring it as far as the central well of the wheel rim. During this first phase, the tire bead is subjected to relatively localized and very high extensile forces.

Next, levers are generally used to force the bead over the wheel rim flange. Effectively, in the case of one-piece wheel rims (this case being by far the most common for passenger car tires), the shape of the wheel rim is designed to allow fitting and removal of the tire by ovalizing the bead without increasing its perimeter. This particularly governs the design of the central mounting well and of the flanges which laterally border the wheel rim and define the mounted position of the bead. During this second phase, the bead is subjected to an overall deformation which is far less penalizing than the stresses that occurred during the first phase.

It is well known that if a tire is removed carelessly there may be irreversible damage to the bead (breakage of carcass cords, tearing of the heel of the bead which is usually retained by a hump, etc.) as a result of the localized and high extensile forces imposed during the first phase of the removal.

This is what is likely to happen if attempts are made to lift the bead all at once with the press by bringing about a high localized offset of the bead relative to the flange of the wheel rim. It is common for the beads to stick tightly to the seats and flanges of the wheel rim after a few months or years of use. This substantial and localized offsetting causes a lengthening of the bead wire, and this may lead to irreparable damage to the bead of the tire.

SUMMARY OF THE INVENTION

The subject of the invention is an improvement to tire beads which is intended to make successive removals of the tire easier without damaging the tire beads and without sacrificing service performance.

According to the invention, a tire comprising a crown and sidewalls extended by beads defining an internal cavity, each bead being defined on the radially inward side by a more or less frustoconical radially inward wall having an axially outward part and an axially inward part, said wall being intended to rest on a wheel rim and, on the side of the internal cavity of the tire, by an axially inward wall, is provided with a slip layer which covers said axially inward part of the radially inward wall and at least the radially lowermost part of the axially inward wall. As a preference, the part of the axially inward wall that is covered with said slip layer extends radially over a length of at least 10 mm.

The slip layer covers only the axially inward part of the radially inward wall, i.e., the part of this wall placed on the side of the internal cavity of the tire. This limitation is very important so as not to degrade the service performance of the tire, especially the anti-unseating effectiveness of the humps, and to prevent any rotation of the tire on the wheel rim.

When removing the tire, the bead will, under the action of the removal tool (the press) begin a tilting movement centered on the region where the axially inward wall and the radially inward wall of the bead meet. The amount of tilting depends on the rotational rigidity of the bead. In the most widespread case, that is a bead which is rigid in terms of rotation, the tilting is very limited. This movement does, however, increase the contact pressure in the region of the radially inward wall which is closest to the internal cavity of the tire, this being the region that has the slip layer, and cause a decrease in the clamping force between the rest of the radially inward wall and the wheel rim. The consequence of this is that the forces which are due to the bead being clamped against the wheel rim are, for the most part, transmitted to a region where the coefficient of slip between the radially inward wall and the wheel rim is very low, and this makes the bead much easier to unstick, allows it to pass much more easily over the hump, and appreciably increases the length of the circular arc of bead that is unstuck for a given amount of offset applied by the press.

When the tire has beads which are not very rigid in terms of rotation, the forces transmitted by the press may cause complete tilting and bring the axially inward wall of the bead into contact with the wheel rim. As the axially inward wall of the bead is itself also covered with a slip layer, the region of contact between the bead and the wheel rim again has a low coefficient of friction which makes the bead easier to unstick, allows it to pass more easily over the hump and, as before, appreciably increases the length of the circular arc of bead that is unstuck for a given amount of offset applied by the press.

Thus, irrespective of the design of bead, the presence of the slip layer reduces the lengthwise extensions imposed on the bead wires during removal, and this limits the risk of them being damaged.

The function of the slip layer is to give a low coefficient of friction between the bead and the wheel rim throughout the life of the tire. This layer may in particular consist of a strip of rubber based on dimethyl siloxane, as proposed in application JP 4-40208.

As a preference, the slip layer consists of the migration to the surface of a compound present in the rubber blend adjacent to the covered parts of the radially and axially inward walls of the beads.

The compound present in the rubber blend adjacent to the parts of the walls of the bead that are covered with the slip layer may be a fatty acid amide and preferably an oleamide. Of these, ethylenebisoleamide has the advantage of having a high melting point and thus offering the slip layer, after it has been formed by migration, good stability.

The adjacent rubber blend contains at least one elastomer chosen from the group of natural, polybutadiene, SBR and butyl rubbers, the butyl-rubber content being less than or equal to 50 parts per hundred by weight of elastomer, and at least 3 parts per hundred by weight of elastomer of the compound.

DESCRIPTION OF THE DRAWINGS

The invention will be better understood with the aid of the description which follows, given by way of non-limiting example with reference to the accompanying drawings in which.

DESCRIPTION OF PREFERRED EMBODIMENTS

Figure 1:
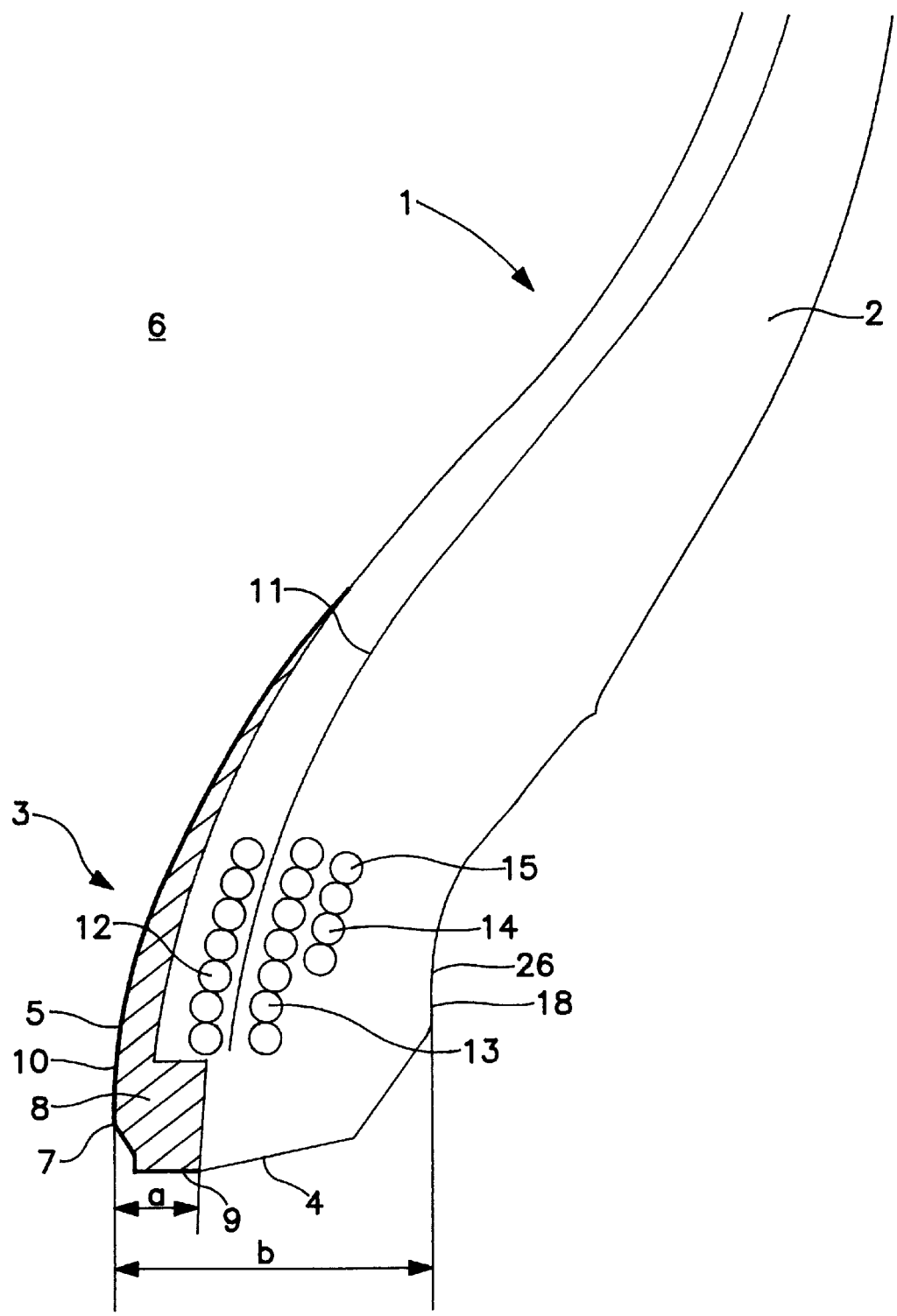
FIG. 1 is a sectional view through a tire bead according to the invention.

FIG. 1 gives a sectional view of an example of a bead 3 of a tire 1 according to the invention. This bead 3 has a structure which has recently been proposed in patent application EP 0582196. This bead 3 does not have the usual design of carcass folded around a bead wire. Instead, at the anchoring point, the carcass reinforcing elements 11 are arranged in a row. If the arrangement of all these elements 11 in space were to be visualized, they would, within the row, approximately form a partial cone frustum the axis of which coincides with the axis of rotation of the tire. The carcass reinforcing elements 11 are bordered laterally by three piles 12, 13 and 14 of circumferential reinforcing elements 15. These piles are made, for example, by spiral winding. The pile 12 is placed on the same side as the internal cavity 6 of the tire relative to the carcass reinforcing elements 11. The piles 13 and 14 are situated on the outward side of the tire. The rubber blends placed between the piles 12, 13 and 14 and the carcass reinforcing elements 11 allow these reinforcing elements 11 and 12, 13 and 14, which are oriented at right angles to each other, to take up load.

Figure 2:
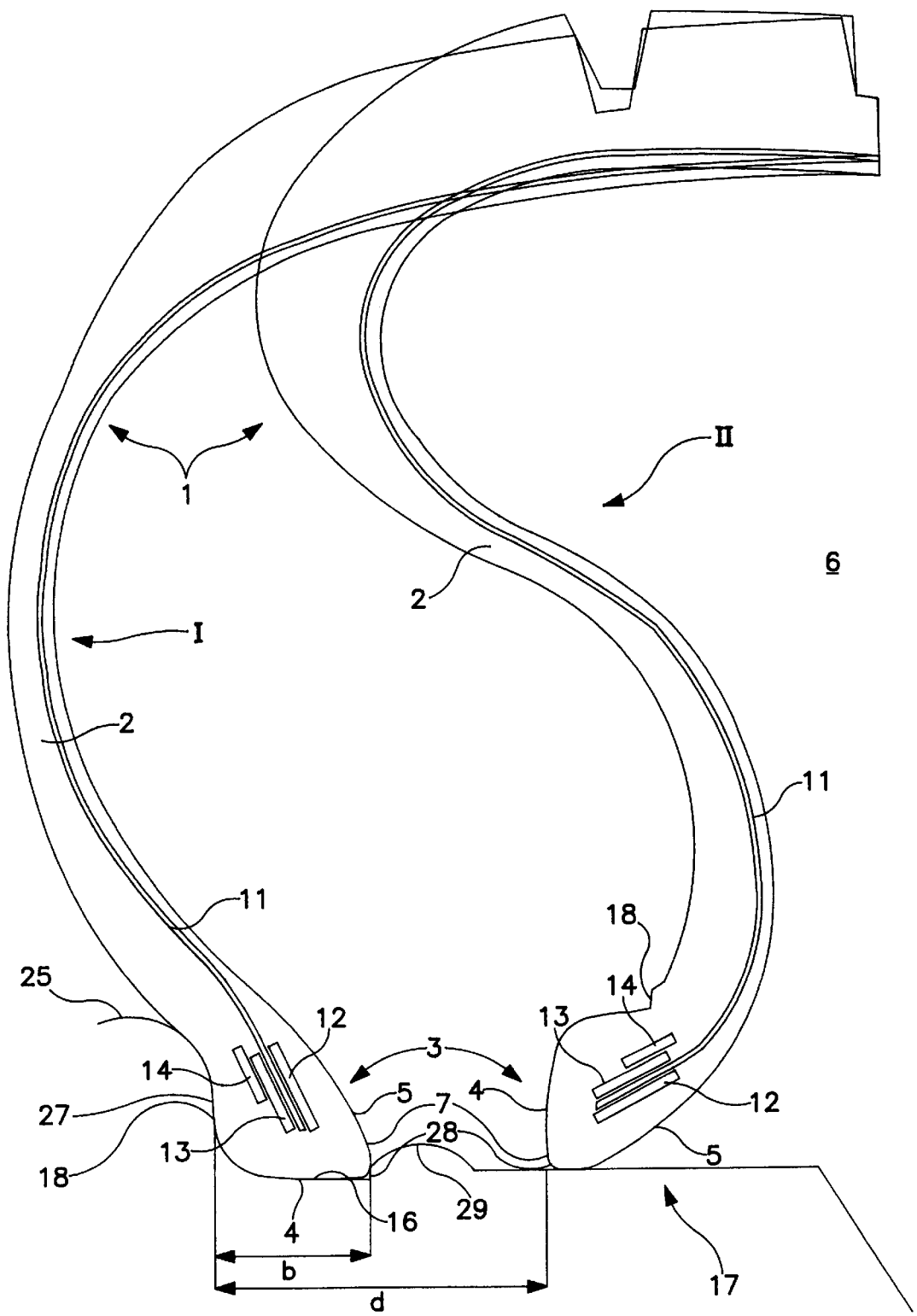
FIG. 2 is a diagrammatic representation of the bead of FIG. 1 during removal.

The bead is delimited by a more or less frustoconical radially inward wall or seat 4 intended to rest on the radially outward wall or seat 16 of a wheel rim 17 (see FIG. 2). This wall 4 is separated in two parts, an axially outward part on the outward part of the tire and an axially inward part 9 on the side of the internal cavity of the tire. The bead is also delimited on the same side as the internal cavity 6 of the tire 1, by an axially inward wall 5 and, on the outside of the tire, by an axially outward wall 18. There is a rubber blend 8 adjacent to the part 9 of the seat 4 on the same side as the internal cavity 6 of the tire 1 as well as at the radially lowermost part 10 of the axially inward wall 5. The bead 3 is extended radially by the sidewall 2 of the tire 1.

The composition of this rubber blend 8 is entirely conventional except that it also contains a partially soluble compound which will migrate to the surface of the parts 9 and 10 to form a slip layer 7. This compound is contained in a proportion of three ph (parts per hundred by weight of elastomer) or more. It should be noted that this compound is only very slightly soluble in a rubber blend based on butyl rubber. If the blend 8 contains butyl rubber it is therefore necessary to restrict the maximum butyl-rubber content to 50 ph.

This compound is, for example, an ethylenebisoleamide (Crodamide® EBO). The migration of this compound to the surface makes it possible to obtain a stable slip layer which has a particularly low coefficient of friction, lower than 0.1.

The seat 4 has an axial length b. This length is defined in FIGS. 1 and 2 as being the distance axially separating the end of the axially inward wall 5 from the region 26 of the axially outward wall 18 that is intended to be placed against the radial part 27 of the wheel rim flange 25. The axial length a of the part 9 adjacent to the rubber blend 8 and thus coated with a slip layer 7 is of the order of 3 to 4 mm. This length a must be limited to approximately one quarter of the axial length b of the seat 4 so as not to degrade the service performance of the tire, especially the anti-unseating effectiveness of the hump 29, and to prevent any rotation on the wheel rim.

The radial height of the rubber blend 8 along the axially inward wall 5 is here of the order of 10 mm. This height can vary greatly as a function of the rigidity in terms of rotation of the bead in question. It is preferably higher, the lower the rotational rigidity of the tire bead.

FIG. 2 illustrates the phenomenon of the bead 3 tilting during the first phase of removal, unsticking the bead 3 from the flange 25 and from the seat 16 of the wheel rim 17. In this figure, the piles 12, 13 and 14 are depicted more diagrammatically without making the distinction that FIG. 1 makes as regards circumferential reinforcing elements 15.

The tire 1 in the position I is mounted on the wheel rim 17. In position II, after its bead has been offset by d, i.e. after it has been shifted axially by an amount d, it can be seen that the bead 3 is tilted partially so that only the region 28 where the axially inward wall 5 meets the end of the seat 4 is in contact with the wheel rim 17. This region 28 is covered with a slip layer 7 consisting of the compound described above. The coefficient of friction between the bead and the wheel rim is therefore very low which makes it easier to unstick the bead.

Figure 3:
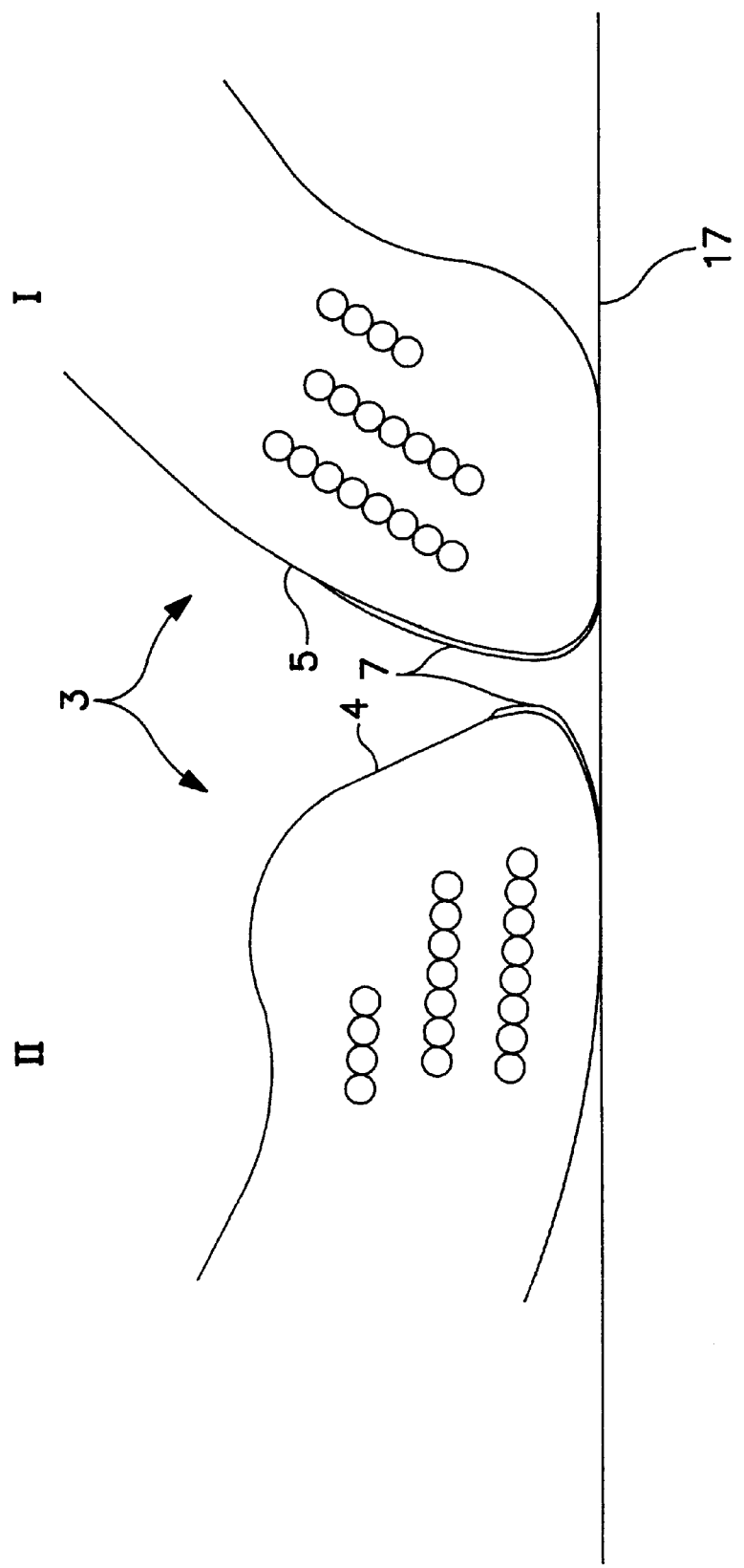
FIG. 3 is a diagram similar to that of FIG. 2 for removal in more severe conditions.

FIG. 3 shows a bead 3 which has tilted completely during an unsticking operation carried out in more severe conditions. In this case, the region of contact between the bead 3 and the wheel rim 17 corresponds to the radially lowermost part 10 of the axially inward wall 5 of the bead 3. This region is well lubricated by the slip layer 7 and unsticking thus becomes even easier.

Figure 4:
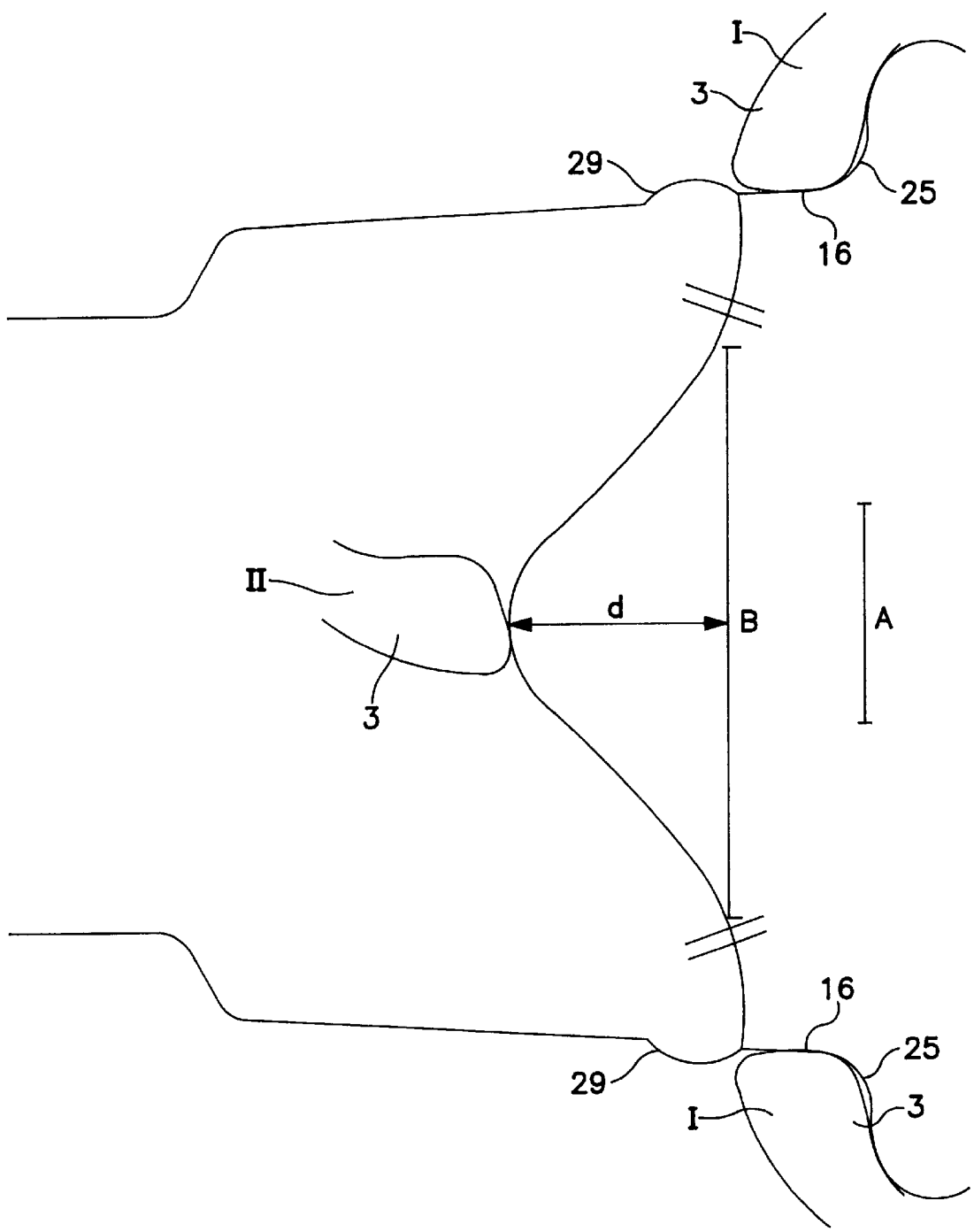
FIG. 4 is a diagrammatic representation, with partial folding, of the change in position of the bead as a function of its angular position.

FIG. 4 diagrammatically illustrates the change in position of the bead 3 relative to the flange 25 of the wheel rim 17 during the first phase of removal. Depicted in this diagram are two external profiles of wheel rim 17 with a bead 3 in place against the hump 29, the seat 16 and the flange 25. This corresponds to position I in FIG. 2. The center of the diagram corresponds to the region A in which a press is applied against the bead 3, and this region extends over an arc of approximately 60 degrees. In this region, a bead 3 is shown in the turned position. This corresponds to position II in FIG. 2. The "offset of the bead relative to the wheel rim flange" is the term given to the separation of this bead from its initial position in place against the seat and flange of the wheel rim. This diagram of FIG. 4 illustrates the unstuck region B of the bead, i.e. the arc where the bead is moved away from its initial position as well as the change in offset as a function of the angular position relative to the press. This arc is called 2α.

Figure 5:
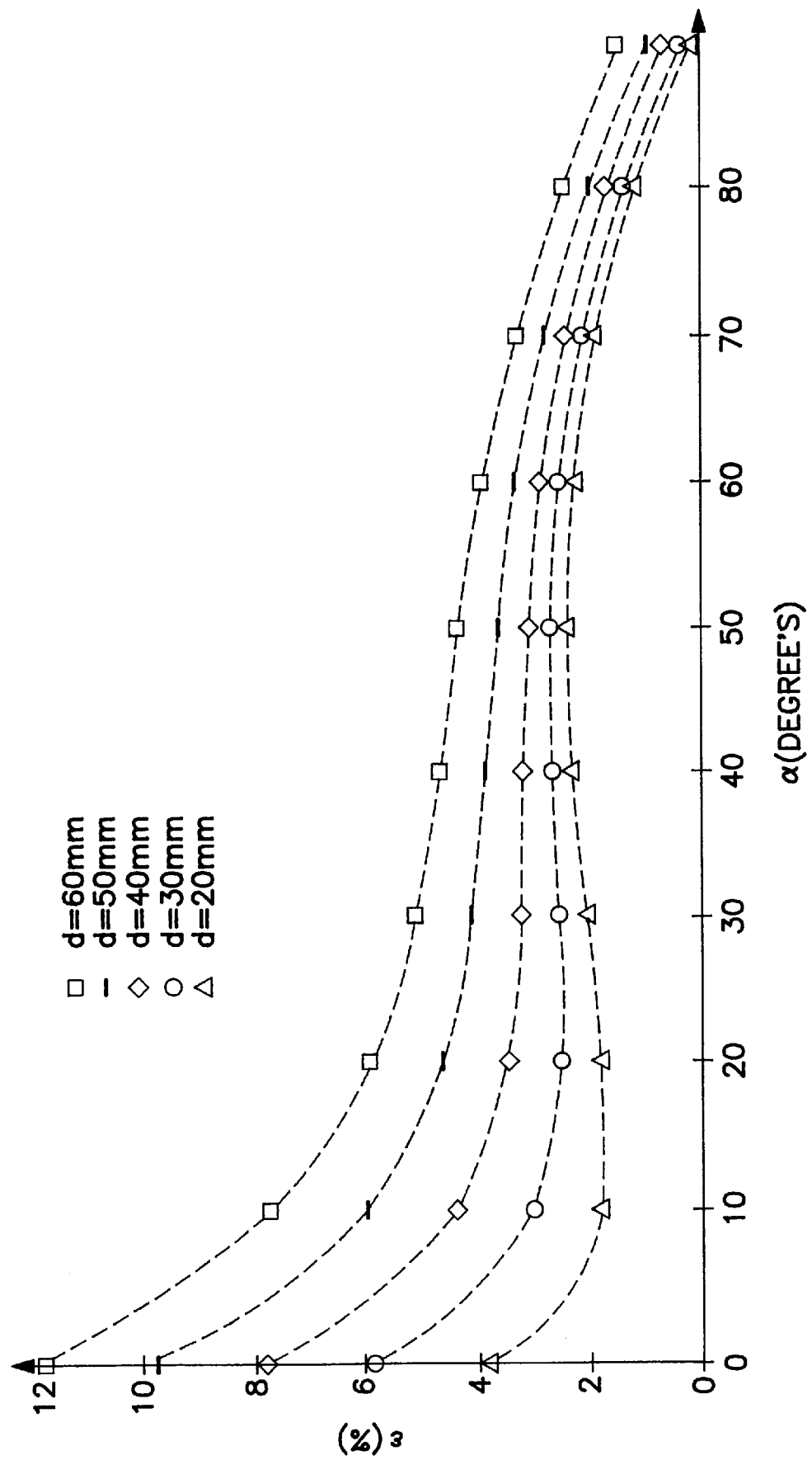
FIG. 5 illustrates the relationship between the average extension imposed on a bead wire as a function of the angle of unsticking and the amount of offset of the bead.

FIG. 5 depicts the change in extension ϵ (in %) of the bead wires as a function of the angle of unsticking α (this angle corresponds to half the arc at the circumference of the bead actually unstuck; α is in degrees) and of the offset d (in millimeters) applied to the bead by the press (see FIG. 4).

An approximate value of this extension for values of angle α below 90 degrees is given by the following formula where R corresponds to the radius of the bead wire:

$$\frac{\Delta L}{L} \approx \frac{1}{2}\sqrt{1 - \cos\alpha + \frac{d^2}{2R^2}} - \frac{\alpha}{180}$$

Given that the offset can easily be as much as 40 mm, it can be seen from these curves that to limit the extension, to which the bead wire or circumferential reinforcing elements is subjected, to values of below 4%, it is desirable for the value of the angle α to be as much as 60 degrees.

Tires with beads comprising a slip layer according to the invention have been tested. For these tires, with an offset of 40 mm, values of α over 60 degrees have been measured.

We claim:

1. A tire comprising a crown and sidewalls extended by beads defining an internal cavity, each bead being delimited on the radially inward side by a more or less frustoconical radially inward wall having an axially outward part and an axially inward part, said wall being intended to rest on a wheel rim and, on the side of the internal cavity of the tire by an axially inward wall wherein a slip layer covers said axially inward part of said radially inward wall and at least the radially lowermost part of said axially inward wall.

2. The tire as set forth in claim 1, wherein the axially inward part of the radially inward wall that is covered with said slip layer extends axially over a length a which is less than one quarter of the axial length b of said radially inward wall.

3. The tire as set forth in claim 1, wherein the part of the axially inward wall that is covered with said slip layer extends radially over a length of at least 10 mm.

4. A tire comprising a crown and sidewalls extended by beads defining an internal cavity, each bead being delimited on the radially inward side by a more or less frustoconical radially inward wall having an axially outward part and an axially inward part, said wall being intended to rest on a wheel rim and, on the side of the internal cavity of the tire, by an axially inward wall, wherein a slip layer covers said axially inward part of said radially inward wall and at least the radially lowermost part of said axially inward wall and wherein said slip layer covering said parts consists of the migration to the surface of a compound present in the rubber blend adjacent to said part.

5. The tire as set forth in claim 4, wherein said compound is a fatty acid amide.

6. The tire as set forth in claim 5, wherein said compound is an oleamide.

7. The tire as set forth in claim 6, wherein said compound is an ethylenebisoleamide.

8. The tire as set forth in claim 4, wherein said rubber blend contains at least one elastomer chosen from the group of natural, polybutadiene, SBR and butyl rubbers, the butyl-rubber content being less than or equal to 50 parts per hundred by weight of elastomer, and at least 3 parts per hundred by weight of elastomer of said compound.

* * * * *